United States Patent
Kitagawa

(10) Patent No.: US 8,327,064 B2
(45) Date of Patent: Dec. 4, 2012

(54) DATA PROCESSOR WITH FLASH MEMORY, AND METHOD FOR ACCESSING FLASH MEMORY

(75) Inventor: Katsuhisa Kitagawa, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 600 days.

(21) Appl. No.: 12/458,226

(22) Filed: Jul. 6, 2009

(65) Prior Publication Data

US 2010/0011155 A1 Jan. 14, 2010

(30) Foreign Application Priority Data

Jul. 11, 2008 (JP) .................................. 2008-181071

(51) Int. Cl.
G06F 12/00 (2006.01)
(52) U.S. Cl. ................................ 711/103; 711/E12.008
(58) Field of Classification Search .................. None
See application file for complete search history.

(56) References Cited

U.S. PATENT DOCUMENTS

| | | | | |
|---|---|---|---|---|
| 5,568,423 A * | 10/1996 | Jou et al. | ................... | 365/185.33 |
| 5,943,692 A * | 8/1999 | Marberg et al. | ................ | 711/203 |
| 6,104,638 A * | 8/2000 | Larner et al. | .............. | 365/185.33 |
| 6,189,081 B1 * | 2/2001 | Fujio | ............................ | 711/171 |
| 6,282,605 B1 * | 8/2001 | Moore | ........................... | 711/103 |
| 6,430,650 B1 * | 8/2002 | Miyauchi | ....................... | 711/103 |
| 6,938,116 B2 * | 8/2005 | Kim et al. | ...................... | 711/103 |
| 7,178,061 B2 * | 2/2007 | Aasheim et al. | ................ | 714/24 |
| 7,246,346 B2 * | 7/2007 | Demsey et al. | ................ | 717/147 |
| 7,315,870 B2 * | 1/2008 | Mukaida | ................................ | 1/1 |
| 7,389,397 B2 * | 6/2008 | Paley et al. | .................... | 711/170 |
| 2006/0212646 A1 | 9/2006 | Nakano | | |
| 2007/0113030 A1 * | 5/2007 | Bennett et al. | ................ | 711/159 |
| 2007/0140007 A1 | 6/2007 | Terauchi | | |

FOREIGN PATENT DOCUMENTS

| | | |
|---|---|---|
| JP | 2006-260468 | 9/2006 |
| JP | 2007-172259 | 7/2007 |
| WO | WO 9510083 A1 * | 4/1995 |

OTHER PUBLICATIONS

Jesung Kim, "A Space-Efficient Flash Translation Layer Fro Compactflash Systems", IEEE Transactions on Consumer Electronics, vol. 48, No. 2, May 2002, pp. 1-10.*

* cited by examiner

*Primary Examiner* — Edward Dudek, Jr.
*Assistant Examiner* — Christopher Birkhimer
(74) *Attorney, Agent, or Firm* — McGinn IP Law Group, PLLC

(57) ABSTRACT

A data processor includes a flash memory that stores a plurality of types of data therein, a random access memory that stores record data information therein, and a controller that can access the flash memory and the RAM. The record data information indicates a head address in the flash memory and a data length corresponding to latest data of each of the plurality of types of data. The controller reads, from the flash memory, the latest data of a type of a reading target among the plurality of types of data, with reference to the record data information.

10 Claims, 11 Drawing Sheets

DATA PROCESSOR WITH FLASH MEMORY, AND METHOD FOR ACCESSING FLASH MEMORY

INCORPORATION BY REFERENCE

This application is based upon and claims the benefit of priority from Japanese Patent Application No. 2008-181071 which was filed on Jul. 11, 2008, the disclosure of which is incorporated herein in its entirety by reference.

BACKGROUND OF THE INVENTION

1. Field of the Invention

The present invention relates to a data processor, and to a method for accessing a memory. More particularly, it relates to a data processor including a flash memory, and to a method for accessing the flash memory.

2. Description of Related Art

As a nonvolatile memory mounted on a semiconductor device such as a microcomputer, a flash memory and an electrically erasable programmable read-only memory (EEPROM) are known. A flash memory and an EEPROM are different from each other in terms of a unit of data erasing, the number of rewritable times, a circuit area, and the like.

For example, the unit of data erasing of the flash memory is block-based while that of the EEPROM is bit-based. Further, the number of rewritable times of the flash memory is around 100 to 1,000, while that of the EEPROM is around 10,000 to 100,000. In essence, the EEPROM is superior to the flash memory from the viewpoint of the unit of data erasing and the number of rewritable times. On the other hand, the flash memory is by far superior to the EEPROM from the viewpoint of the circuit area.

Thus, a proposition has been made to mount both a flash memory and an EEPROM on a semiconductor device, and to use either the flash memory or the EEPROM according to a record data. For example, the flash memory is used when a data amount is large, or when data is to be rewritten only with low frequency. On the other hand, the EEPROM is used when a data amount is small, or when data is to be rewritten with high frequency.

To mount both a flash memory and an EEPROM on a semiconductor device, however, results in a large disadvantage from the viewpoint of a manufacturing process and a manufacturing cost. Accordingly, there is proposed a technique in which only a flash memory is mounted on a semiconductor device, and a part of the flash memory is treated like an EEPROM (refer to JP-A-2006-260468 and JP-A-2007-172259). A technique of using a part of a flash memory like an EEPROM is generally called an "EEPROM emulation."

When data in a memory cell of a flash memory is rewritten, new data cannot be written unless data stored in the memory cell is erased. Here, data in a flash memory is erased in units of blocks. Thus, in a usual flash memory, certain data in a certain block needs to be rewritten after all data in the block is erased. In the EEPROM emulation, data is basically not rewritten. Instead, new data is additionally written to a free space (unused space) to which no data has been written yet. Then, when an allocated block is full, record data in the block is erased in a lump. Thereby, the number of rewriting times for one memory cell is reduced, and thus apparently increasing the number of rewritable times approximately to that of an EEPROM.

In the EEPROM emulation, a specific memory access method is required in order to write new data to a free space, and to read the latest data of data accumulated by addition. Hereinafter, a memory access method stated in JP-A-2006-260468 will be described with reference to FIG. 1.

As shown in FIG. 1, a flash memory has multiple blocks. Of these, a block B1 is used as a data length storage space. The data length storage space stores therein information on correspondence relations between identifiers (e.g., ID1, ID2, ID3) of multiple types of data and data lengths thereof, respectively. Meanwhile, blocks Bm to Bn are used as data storage spaces for storing the data. In each data storage space, multiple types of data D1 to D3 are stored together with their respective identifiers ID1 to ID3. A space where a certain data and its identifier are stored is referred to as a "section."

At the time of accessing the data storage space, "skip processing" is performed. Specifically, an identifier stored in a head section is firstly read. Subsequently, a data length corresponding to the identifier thus read is obtained by referring to the information stored in the data length storage space. An address to be accessed is shifted by the data length thus obtained, thereby enabling an access to a next section without reading of data stored in the head section. This is the "skip processing".

By repeatedly performing skip processing, the head of a free space in the data storage space can be detected. At the time of data writing, new data and its identifier are added to the head of the free space thus detected, so that a new section is formed. At the time of data reading, it is necessary to read the latest version (i.e., one stored in the last address) of a type of data that is a "reading target". To do this, when an identifier is read from a certain section in the skip processing, it is determined whether or not this identifier matches the identifier of the reading target. If the identifiers match, then an address of the reading target is updated with the address of the section. When a free space is detected by repeatedly performing the skip processing, the address of the reading target held at this time indicates the address of the latest data of the reading target. Accordingly, the latest data is read by returning to the address of the reading target.

SUMMARY

However, the present inventor has recognized the following point. Namely, it takes time to detect an access target when the skip processing is performed as shown in FIG. 1. Especially, when a large number of pieces of data have already been written to a block, the skip processing needs to be performed time and time again (i.e., repeatedly) until a free space is detected. This causes an increase in access processing time. Further, time to detect the free space varies depending on the number of pieces of data already written to the block. In other words, access processing time largely varies and is thus unpredictable. This complicates system design.

The present invention seeks to solve one or more of the above problems, or to improve upon those problems at least in part.

In one exemplary embodiment, a data processor includes a flash memory that stores a plurality of types of data therein, a random access memory that stores record data information therein, and a controller that can access the flash memory and the RAM. The record data information indicates a head address in the flash memory and a data length corresponding to latest data of each of the plurality of types of data. The controller reads, from the flash memory, the latest data of a type of a reading target among the plurality of types of data, with reference to the record data information.

In another exemplary embodiment, a data processor includes a flash memory, a RAM that stores therein free space information indicating a head address of a free space in the flash memory, and a controller that can access the flash memory and the RAM. The controller writes new data to a head of the free space with reference to the free space information, when writing the new data to the flash memory.

In yet another exemplary embodiment, a method of accessing a flash memory includes reading latest data for each identifier from the flash memory, creating record data including a head address in the flash memory and a data length in response to each of the read latest data, storing the record data into a random access memory (RAM), with respect to each of the identifiers, acquiring an identifier of a reading target, reading the record data corresponding to the identifier of the reading target from the RAM, and reading data of the reading target from the flash memory based on the read record data.

According to the present invention, in the EEPROM emulation, the latest data of the type of a reading target can be read at high speed from a flash memory. Further, according to the present invention, in the EEPROM emulation, new data can be written at high speed to a flash memory. In other words, access processing time is reduced as a whole. Further, variation in access processing time is eliminated since no skip processing is performed.

BRIEF DESCRIPTION OF THE DRAWINGS

The above and other purposes, advantages and features of the present invention will become more apparent from the following description of a certain exemplary embodiment taken in conjunction with the accompanying drawings in which.

DETAILED DESCRIPTION OF THE EXEMPLARY EMBODIMENTS

The invention will now be described herein with reference to an illustrative exemplary embodiment. Those skilled in the art will recognize that many alternative embodiments can be accomplished using the knowledge of the present invention, and that the invention is not limited to the exemplary embodiment illustrated for explanatory purposes.

First Exemplary Embodiment

1. Configuration

Figure 2:
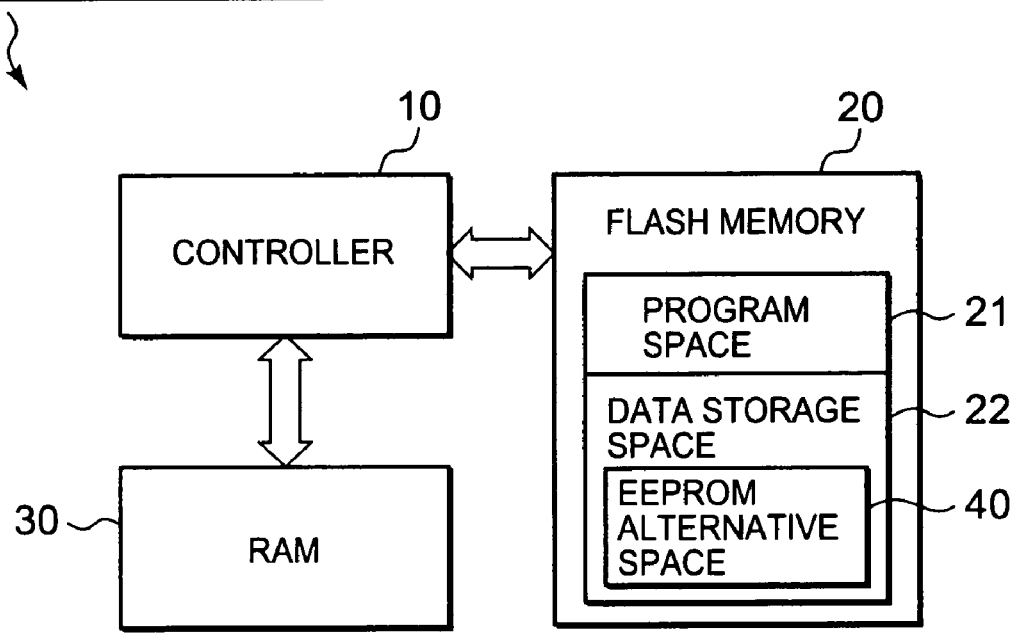
FIG. 2 is a block diagram showing a configuration of a data processor 1 according to a first exemplary embodiment of the present invention.

FIG. 2 is a block diagram showing a configuration of a data processor 1 according to a first exemplary embodiment of the present invention. The data processor 1 is, for example, a microcomputer. The data processor 1 includes a controller 10, a flash memory 20, and a random access memory (RAM) 30.

The controller 10 includes a central processing unit (CPU) and a flash memory controller. The controller 10 is accessible to the flash memory 20 and the RAM 30. The controller 10 writes data to and reads data from the flash memory 20 and the RAM 30 by executing a memory access program.

The flash memory 20 has a program space 21 for storing a program, and a data storage space 22 for storing user data. According to the first exemplary embodiment, at least a part of the data storage space 22 is used for the EEPROM emulation. The space, which is allocated for the EEPROM emulation, of the data storage space 22 is hereinafter referred to as an "EEPROM alternative space 40." The space to be allocated as the EEPROM alternative space 40 is previously determined and fixed.

Figure 3:
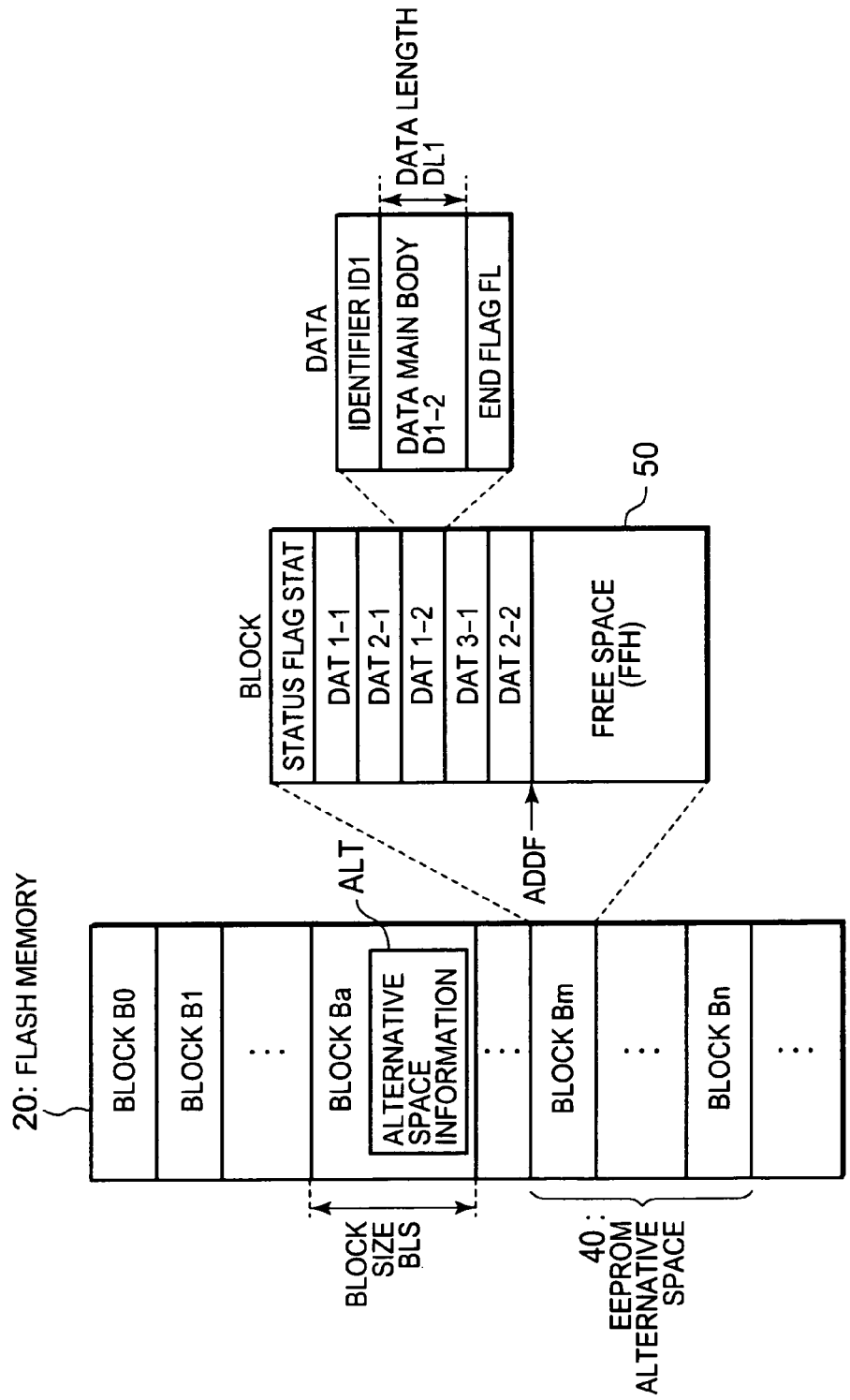
FIG. 3 is a schematic diagram showing data recorded in a flash memory 20 according to the first exemplary embodiment.

FIG. 3 schematically shows the flash memory 20 according to the first exemplary embodiment. The flash memory 20 has multiple blocks B0, B1 . . . . A block size BLS and an address range of one block is previously determined for each product. Further, data in the flash memory 20 is erased in units of a block.

As described above, at least a part of the flash memory 20 is used for the EEPROM alternative space 40. In an example of FIG. 3, blocks Bm to Bn (m≦n) are used for the EEPROM alternative space 40. Alternative space information ALT indicates the range of the EEPROM alternative space 40. For example, the alternative space information ALT indicates block numbers of the head block Bm and the last block Bn of the EEPROM alternative space 40. The alternative space information ALT is stored in a certain block Ba. Note that, since the EEPROM alternative space 40 is fixed, update of the alternative space information ALT is not required. Accordingly, the alternative space information ALT may be stored in any of the program space 21 and the data storage space 22.

Blocks included in the EEPROM alternative space 40 each have a status flag STAT. The status flag STAT indicates information on the usage state of the block, and is recorded in the head of the block. Types of the status flag STAT include, for example, "available," (which may mean "valid") "not available," (which may mean "invalid") "unused," and "disabled." In an initial state, the status flag STAT of each block is set to "unused." When available data is written to a certain block, the status flag STAT of the block is changed to "available."

In the EEPROM alternative space 40, pieces of data DAT are sequentially written from the head block Bm. In a block, the pieces of data DAT are sequentially recorded following the status flag STAT. A space, to which no data DAT has been written yet, in the EEPROM alternative space 40 is a free space 50 (i.e., unused space). The head address of the free space 50 is hereinafter referred to as a "free space head address ADDF."

Data DAT is classified on the basis of the type thereof, and each type of data DAT is identified by an "identifier ID." In the example of FIG. 3, three different types of data DAT1, DAT2, and DAT3 are recorded in the EEPROM alternative space 40.

The data DAT1, DAT2, and DAT3 are respectively identified by identifiers ID1, ID2 and ID3. The identifier ID of each piece of the data DAT is determined and managed by the user, for example.

Further, as will be described in detail later, when the latest data DAT of a certain type is written, existing data DAT of the same type is not overwritten with the latest data DAT. Specifically, the latest data DAT is additionally written to the free space 50 of the EEPROM alternative space 40 without the existing data DAT of the same type overwritten therewith. Thus, multiple pieces of the data DAT of the same type (i.e., the same identifier ID) can exist in the EEPROM alternative space 40. For example, in FIG. 3, the data DAT1-1 and DAT1-2 are of the same type (i.e., identifier ID1); however, the contents thereof are different. In this case, the data DAT1-1 closer to the head is the old data DAT1; the data DAT1-2 whose address is located thereafter (i.e., relatively further from the head) is the latest (i.e., most current) data.

Each piece of the data DAT includes: the identifier ID indicating the type of the data; a data main body; and an end flag FL indicating the end of the data. For example, as shown in FIG. 3, the data DAT1-2 is formed of the identifier ID1, a data main body D1-2, and the end flag FL. The identifier ID exists at the head of the data DAT, while the end flag FL exists at the end of the data DAT. The size of the identifier ID and the size of the end flag FL are determined in advance. A data length DL is the size of the data main body (or the whole data DAT). Data lengths DL1, DL2 and DL3 are data lengths of the identifiers ID1, ID2 and ID3, respectively.

Figure 4:
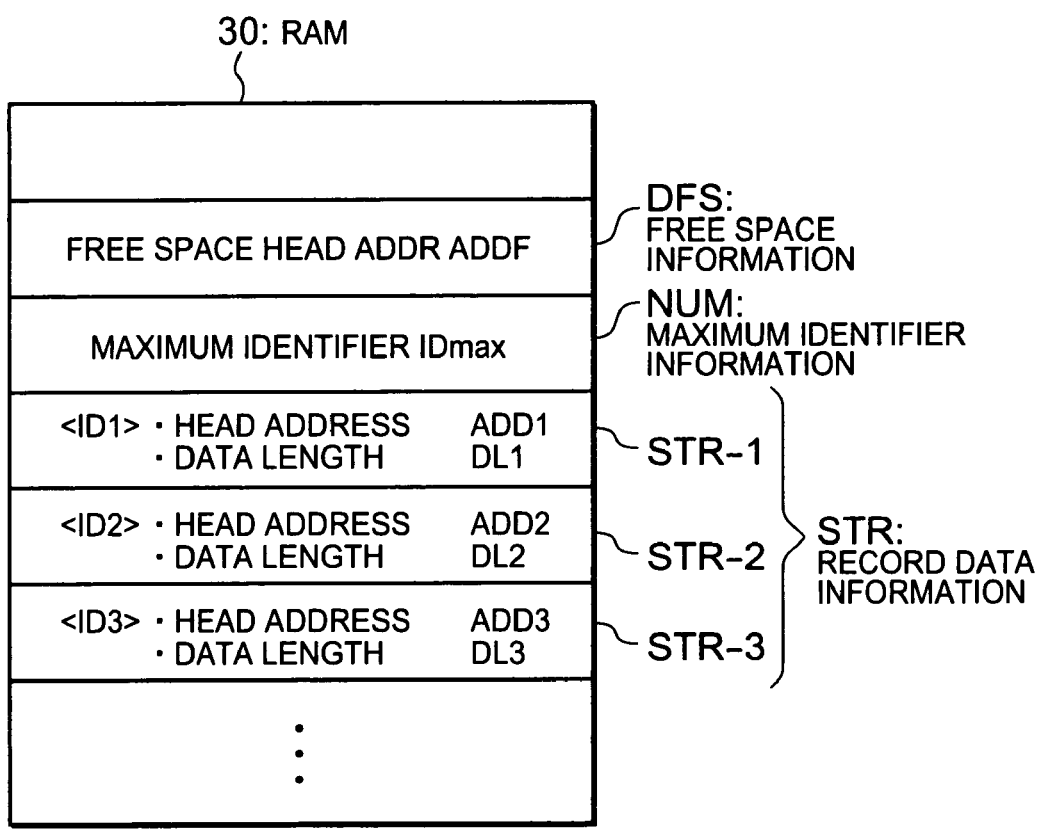
FIG. 4 is a schematic diagram showing information stored in a RAM 30 according to the first exemplary embodiment.

FIG. 4 schematically shows the RAM 30 according to the first exemplary embodiment. The RAM 30 stores therein free space information DFS, maximum identifier information NUM, and record data information STR. These kinds of information may be stored in any of a user space and a dedicated space of the RAM 30.

The free space information DFS indicates the free space head address ADDF in the EEPROM alternative space 40.

The maximum identifier information NUM indicates a "maximum identifier IDmax" having the largest number among the identifiers ID. For example, when the three types of data DAT1, DAT2, and DAT3 are recorded in the EEPROM alternative space 40, the maximum identifier IDmax is "ID3." The maximum identifier IDmax may be updated in some cases when data DAT of a new type is written.

The record data information STR indicates a head address ADD and the data length DL of the latest data of each type (i.e., identifier ID) of data DAT. Here, the head address ADD denotes a head address of a range, in which the latest data DAT (or the data main body thereof) is stored, in the EEPROM alternative space 40. In FIG. 4, the record data information STR includes record data information STR-1, STR-2 and STR-3. The record data information STR-1 indicates a head address ADD1 and the data length DL1 of the latest data of the data DAT1 with the identifier ID1. The record data information STR-2 indicates a head address ADD2 and the data length DL2 of the latest data of the data DAT2 with the identifier ID2. The record data information STR-3 indicates a head address ADD3 and the data length DL3 of the latest data of the data DAT3 with the identifier ID3. A location to store the record data information STR in the RAM 30 is preferably determined in advance for each identifier ID.

In the first exemplary embodiment, fast access to the EEPROM alternative space 40 is achieved by appropriately using the information described above. Hereinafter, access processing according to the first exemplary embodiment will be described in detail. In section 2, initialization processing will be described. In section 3, data reading processing will be described. In section 4, data writing processing will be described.

2. Initialization Processing

Figure 5:
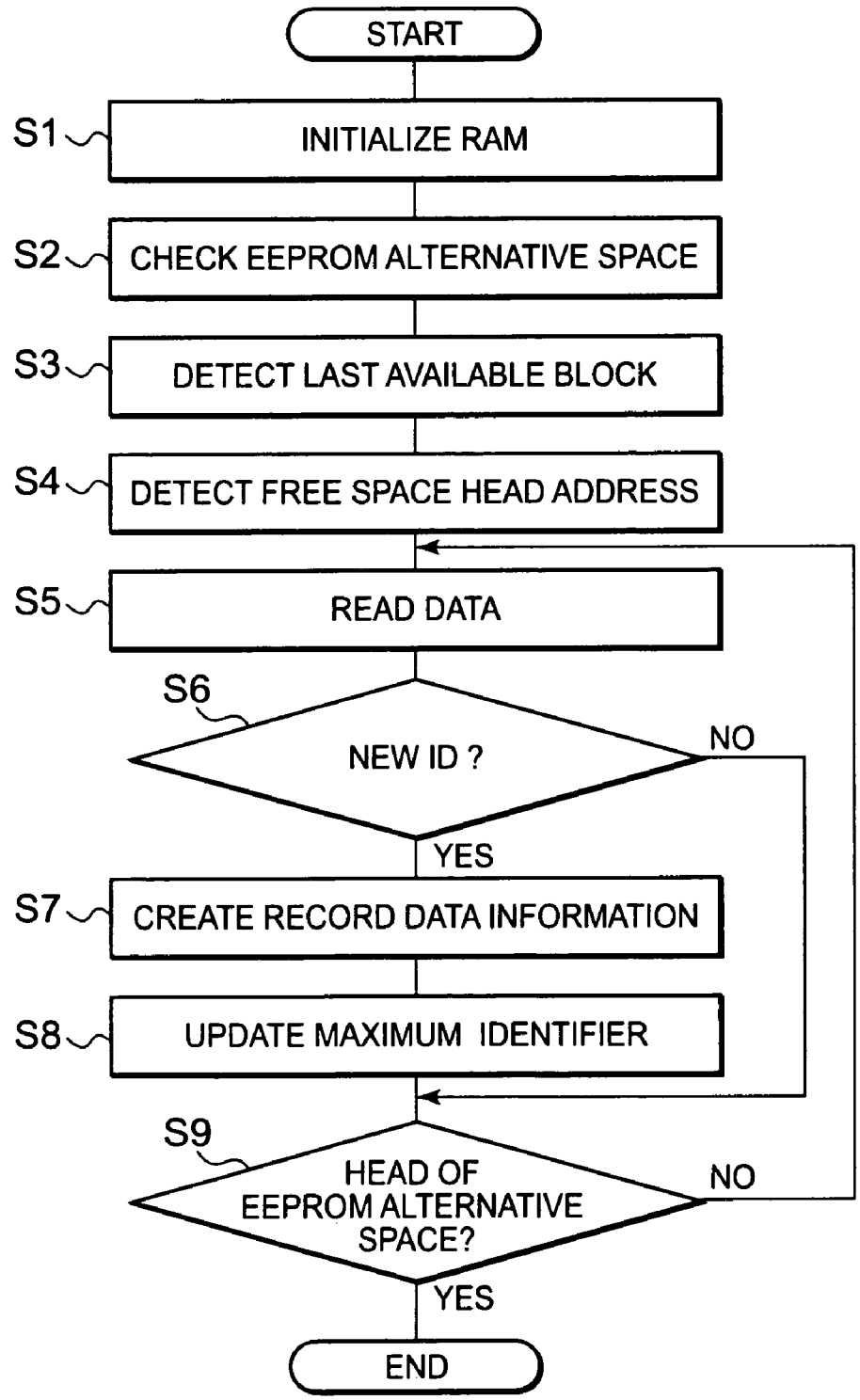
FIG. 5 is a flowchart showing initialization processing according to the first exemplary embodiment.
Figure 6:
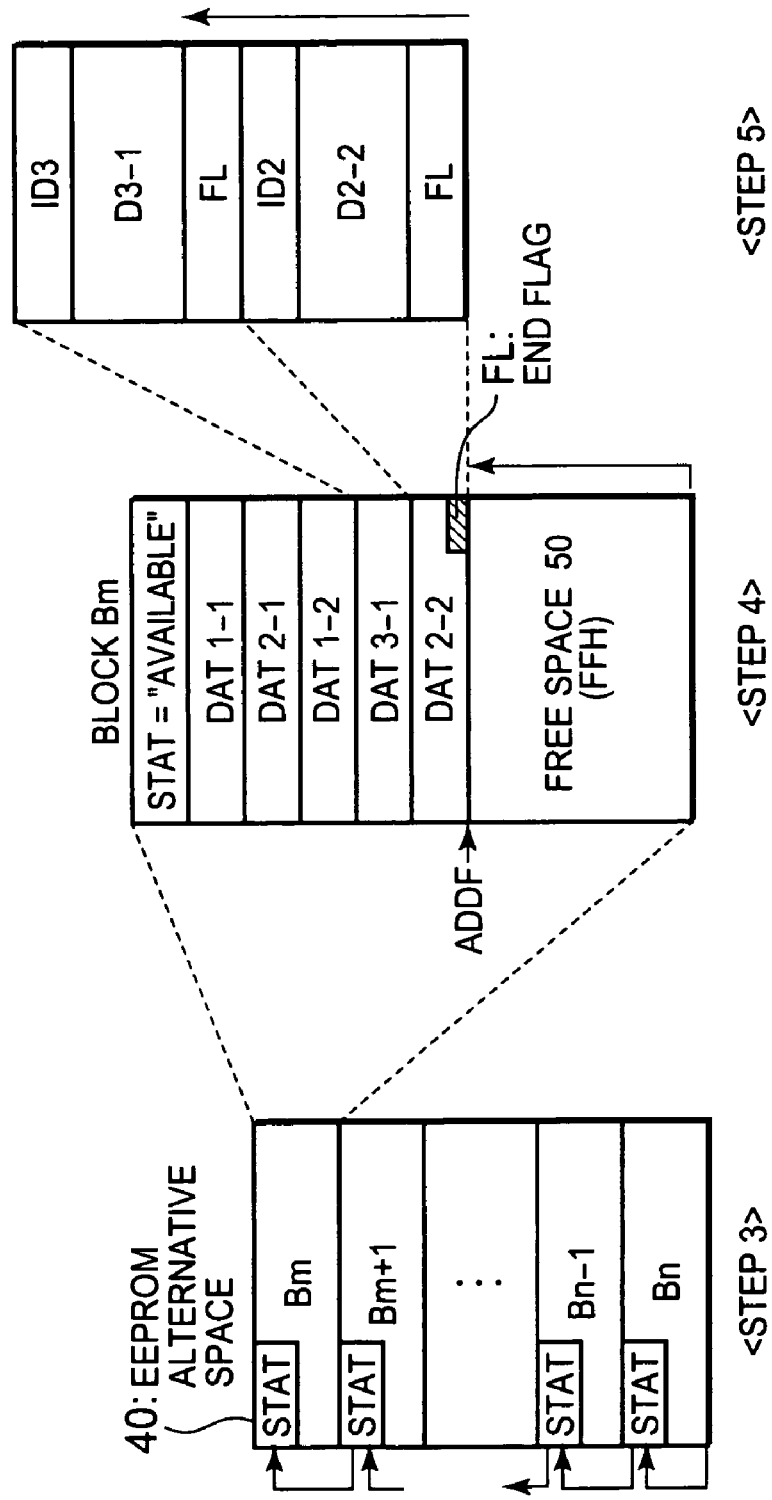
FIG. 6 is a schematic diagram for illustrating the initialization processing according to the first exemplary embodiment.

Initialization processing is performed when the data processor 1 is turned on. Specifically, the state where the data DAT has been recorded in the flash memory 20 is detected. Then, the free space information DFS, the maximum identifier information NUM, and the record data information STR described above are created. The information thus created is stored in the RAM 30. In other words, a state immediately before power is turned off is reproduced. FIG. 5 is a flowchart showing the initialization processing according to the first exemplary embodiment. FIG. 6 schematically shows the initialization processing. The initialization processing will be described with reference to FIG. 5 and FIG. 6.

Step S1:

Firstly, the RAM 30 is initialized in response to a reset signal at the time of turning on the power.

Step S2:

Subsequently, the controller 10 reads the alternative space information ALT stored in the flash memory 20. The controller 10 can comprehend the range of the EEPROM alternative space 40 by referring to the alternative space information ALT. The EEPROM alternative space 40 is a range to be checked for creating the free space information DFS, the maximum identifier information NUM and the record data information STR described above. It can be said that the range to be checked in the flash memory 20 can be instantly known owing to the presence of the alternative space information ALT. In essence, the efficiency of the initialization processing is enhanced.

Step S3:

Next, the controller 10 detects an available block in the EEPROM alternative space 40. The available block is a block in which available data is written, and in which the status flag STAT is set to "available." Thus, the controller 10 can detect the available block by sequentially referring to the status flag STAT of each block.

More specifically, as shown in FIG. 6, the controller 10 searches for the available blocks from the last block Bn toward the head block Bm so as to detect the last available block in the EEPROM alternative space 40. The last block Bn is indicated by the alternative space information ALT. Moreover, the block size BLS of one block is previously determined. Accordingly, the controller 10 can skip and read only the status flag STAT of each block without reading the detail of each block. As a result, the last available block (example: block Bm) in the EEPROM alternative space 40 is quickly detected. In this manner, the available block can be effectively detected since each block has the status flag STAT. In essence, the efficiency of the initialization processing is enhanced.

Step S4:

Subsequently, the controller 10 detects the head of the free space 50 from the last available block Bm detected in Step S3. Specifically, as shown in FIG. 6, the controller 10 searches for the end flag FL of the data DAT from the end address of the available block Bm toward the head address thereof. A space formed until the end flag FL is firstly detected is the free space 50. Further, a space following the end flag FL firstly detected is the head of the free space 50. In this way, the controller 10 can easily detect the head address ADDF of the free space 50. The controller 10 creates the free space information DFS indicating the free space head address ADDF, and stores it in the RAM 30.

Step S5:

Next, the controller 10 sequentially reads the data DAT from the free space head address ADDF toward the head of the EEPROM alternative space 40. Specifically, as shown in FIG. 6, the controller 10 detects the end flag FL of each piece of the data DAT, and specifies a region formed between each two successive end flags FL as one piece of the data DAT. The size of the identifier ID and the size of the end flag FL are previously determined, and therefore the controller 10 can recognize the identifier ID, the data length DL and the head address ADD of the data DAT thus read.

Step S6:

Every time one piece of the data DAT is read, the controller 10 checks the identifier ID of the read data DAT. If the identifier ID is a new type ID (i.e., Step S6; Yes), then it means that the read data DAT is the "latest data" with this identifier ID. In this case, the process moves to the next Step S7. On the other hand, if the identifier ID is one that has already been read (i.e., Step S6; No), then it means that the read data DAT is older than the latest (most current) data. In this case, the process moves to Step S9.

Step S7:

If data DAT with a new identifier ID is read, then the data DAT is the latest (most current) data with this identifier ID. Thus, the controller 10 creates the record data information STR on this identifier ID. The record data information STR indicates the head address ADD and the data length DL of the latest data with this identifier ID. The controller 10 stores the record data information STR thus created in the RAM 30.

Step S8:

The maximum identifier IDmax indicated by the maximum identifier information NUM is firstly set to an initial value (example: ID0). Every time data DAT with a new identifier ID is read, the controller 10 compares the new identifier ID with the current maximum identifier IDmax. If the new identifier ID is larger than the current maximum identifier IDmax, then the controller 10 overwrites the maximum identifier IDmax with the new identifier ID. In other words, the controller 10 updates the maximum identifier information NUM. On the other hand, if the new identifier ID is equal to or smaller than the current maximum identifier IDmax, then the controller 10 does not update the maximum identifier information NUM.

Step S9:

If the read data DAT is not the data at the head of the EEPROM alternative space 40 (i.e., Step S9; No), then the process returns to Step S5. Then, the next data DAT is read. In essence, the controller 10 repeats the above Steps S5 to S8 from the free space head address ADDF toward the head of the EEPROM alternative space 40. If all the data DAT are read (i.e., Step S9; Yes), then the initialization processing is terminated.

In the case of the available block Bm shown in FIG. 6, the initialization processing is performed in the following manner. Firstly, the latest data DAT2-2 with the identifier ID2 is read, and then the record data information STR-2 on the identifier ID2 is created. Here, the maximum identifier IDmax is updated from the initial value to the ID2. Next, the latest (most current) data DAT3-1 with the identifier ID3 is read, and then the record data information STR-3 on the identifier ID3 is created. Here, the maximum identifier IDmax is updated from the ID2 to the ID3.

Subsequently, the latest data DAT1-2 with the identifier ID1 is read, and then the record data information STR-1 on the identifier ID1 is created. Here, the maximum identifier IDmax is not updated. Then, old data DAT2-1 with the identifier ID2 is read. Lastly, old data DAT1-1 with the identifier ID1 is read. In this manner, pieces of record data information STR-1 to STR-3 on pieces of the latest data with the respective identifiers ID are created. Further, the maximum identifier information NUM indicating the maximum identifier IDmax=ID3 is created.

As described above, according to the first exemplary embodiment, the initialization processing can be effectively performed by using the alternative space information ALT, the status flag STAT, the end flag FL, and the like.

3. Data Reading Processing

Figure 7:
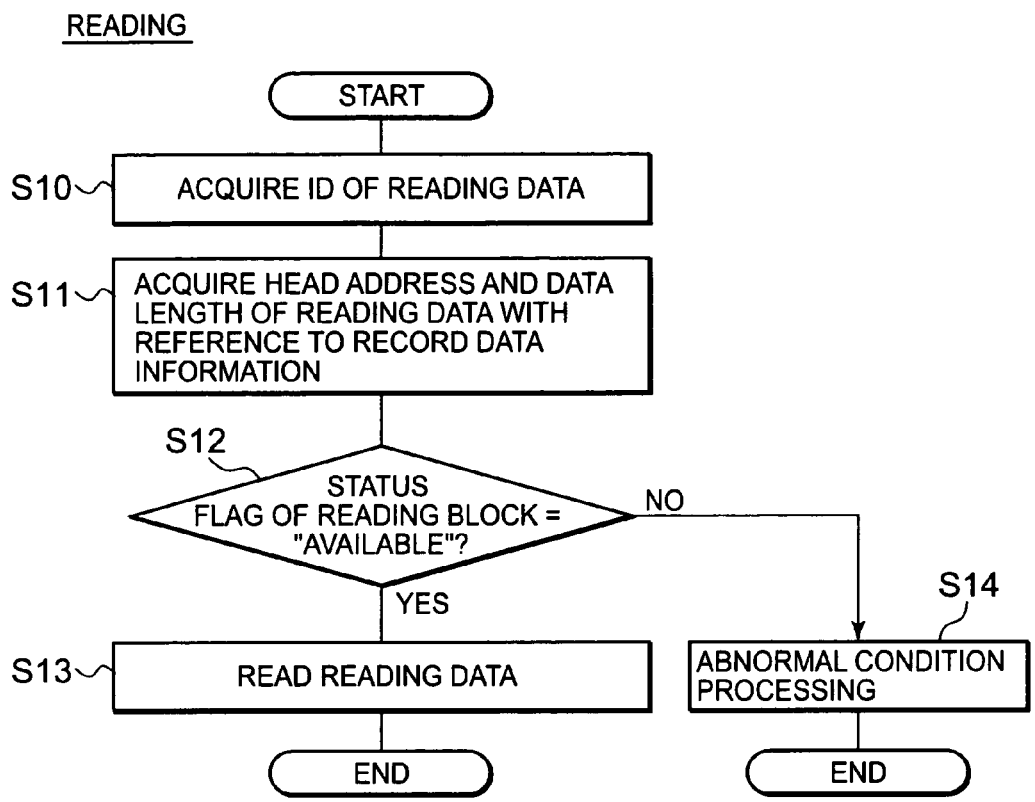
FIG. 7 is a flowchart showing data reading processing according to the first exemplary embodiment.

Next, data reading from the EEPROM alternative space 40 will be described. FIG. 7 is a flowchart showing data reading processing according to the first exemplary embodiment.

Firstly, the controller 10 acquires an identifier ID of read data being a reading target (Step S10). Subsequently, the controller 10 acquires the head address ADD and the data length DL of the latest data DAT with the identifier ID of the reading target, with reference to the record data information STR stored in the RAM 30 (Step S11). Next, the controller 10 checks the status flag STAT of a reading block including the head address ADD (Step S12). If the status flag STAT indicates "available" (i.e., Step S12; Yes), then the controller 10 reads the latest data DAT of the reading target (i.e., read data) from the reading block, on the basis of the head address ADD and the data length DL (Step S13). On the other hand, if the status flag STAT does not indicate "available" (i.e., Step S12; No), then the controller 10 performs abnormal condition processing (example: stop, error output, and the like) (Step S14).

For example, when the identifier ID of the reading target is "ID1," the controller 10 refers to the record data information STR-1 stored in the RAM 30. The record data information STR-1 indicates the head address ADD1 and the data length DL1 of the latest data DAT1-2 with the identifier ID1. Thus, the controller 10 can instantly read the latest data DAT1-2 from the EEPROM alternative space 40, on the basis of the head address ADD1 and the data length DL1.

Figure 1:
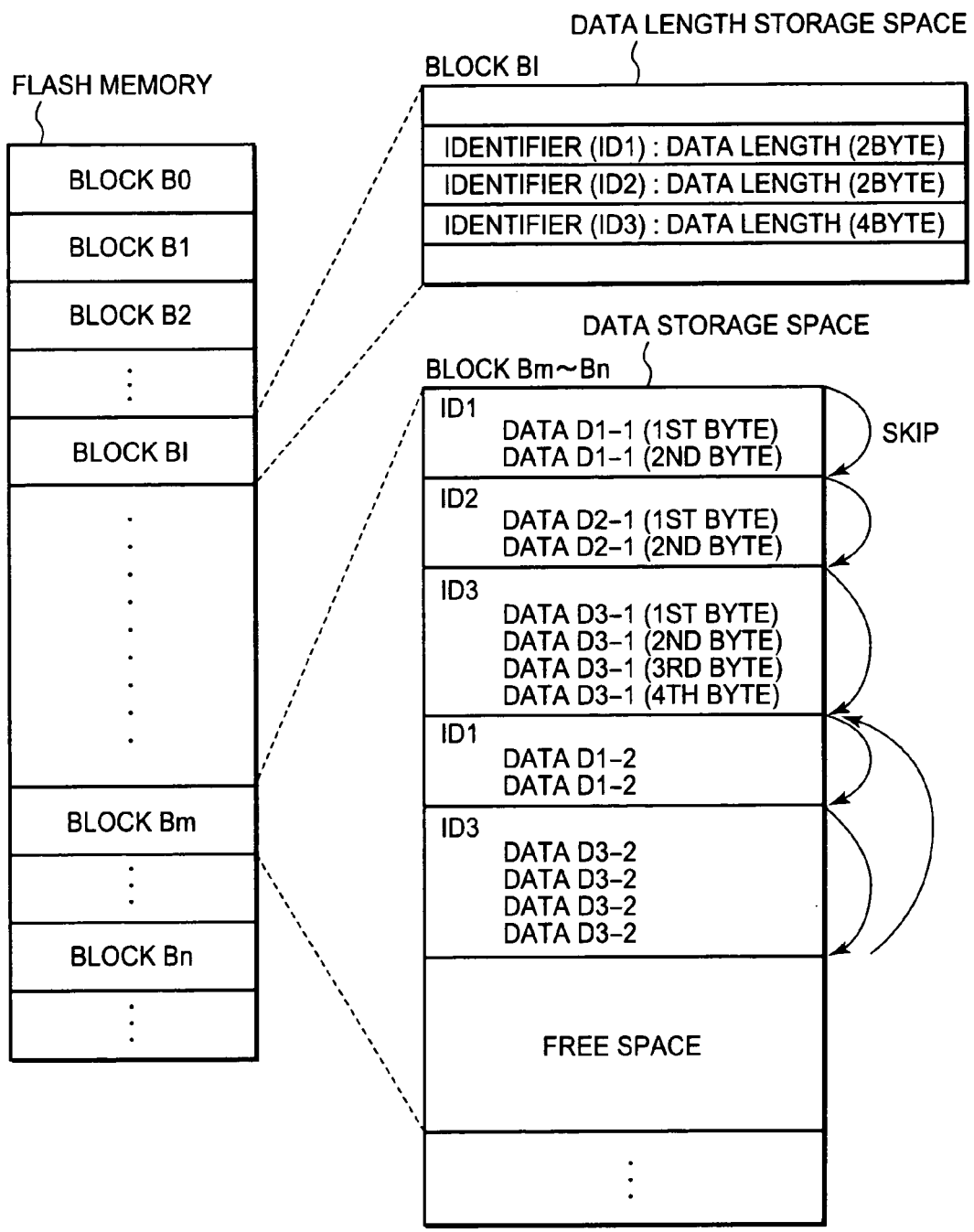
FIG. 1 is a schematic diagram for illustrating an EEPROM emulation in a related art.

As described above, according to the first exemplary embodiment, the latest data DAT of a type of a reading target can be read at high speed by referring to the record data information STR stored in the RAM 30. The skip processing as shown in FIG. 1 is not required. Even when many pieces of the data DAT have already been written in a block, it is possible to immediately access the reading target by referring to the record data information STR. In essence, access processing time in the EEPROM emulation is reduced. Further, variation in access processing time is eliminated since no skip processing is performed. This facilitates system design.

4. Data Writing Processing

Figure 8:
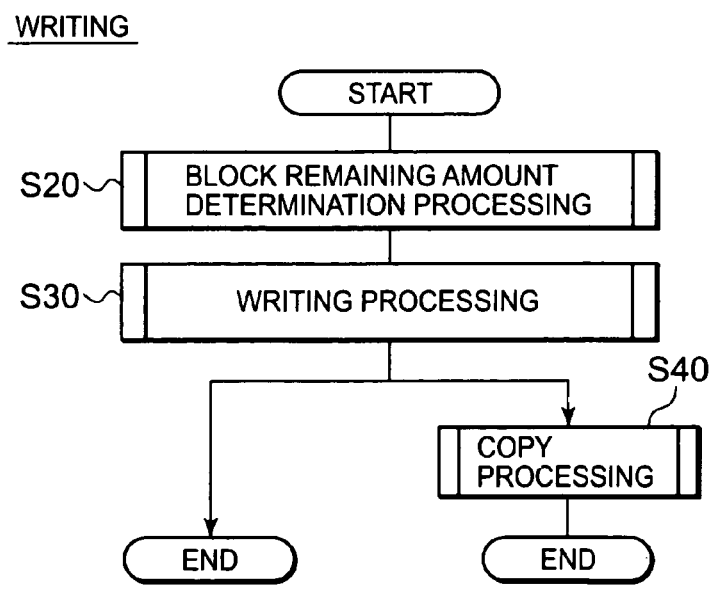
FIG. 8 is a flowchart showing data writing processing according to the first exemplary embodiment.

Next, data writing to the EEPROM alternative space 40 will be described. FIG. 8 is a flowchart showing data writing processing according to the first exemplary embodiment. As shown in FIG. 8, the data writing processing is broadly divided into block remaining amount determination processing (Step S20), writing processing (Step S30), and copy processing (Step S40).

In the writing processing (Step S30), existing data in the EEPROM alternative space 40 is not overwritten, and new data is additionally written to the free space 50. Here, if the remaining amount in a block including the head of the free space 50 is insufficient for data to be written, then a writing destination needs to be changed to a next block. The block remaining amount determination processing (Step S20) performs this processing. The copy processing (Step S40) is an option, and does not necessarily have to be performed. Hereinafter, each step will be described in detail.

4-1. Block Remaining Amount Determination Processing (Step S20)

Figure 9:
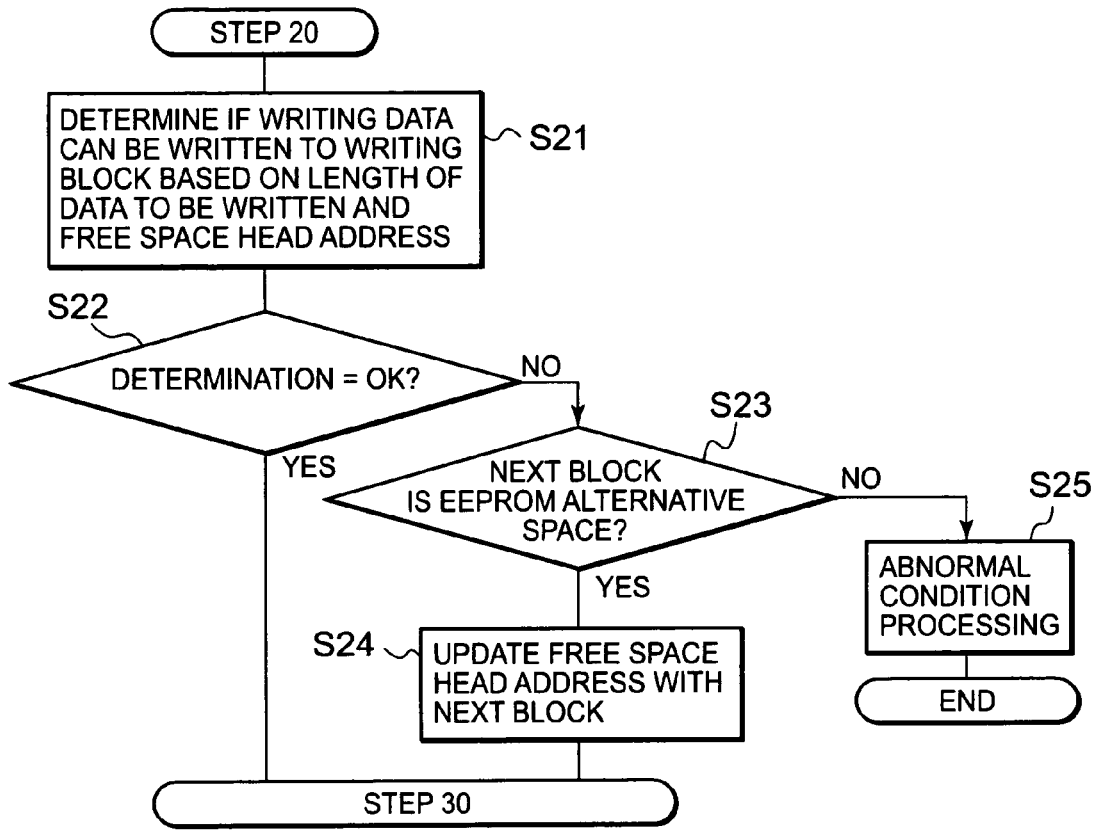
FIG. 9 is a flowchart showing Step S20 of the data writing processing according to the first exemplary embodiment.

FIG. 9 is a flowchart showing Step S20 according to the first exemplary embodiment.

Step S21:

The controller 10 acquires the data length DL of new write data. Further, the controller 10 acquires the free space head address ADDF with reference to the free space information DFS stored in the RAM 30. A current writing destination block is a block where the head of the free space 50 indicated by the free space head address ADDF exists. On the basis of the block size BLS and the free space head address ADDF, the controller 10 can calculate the capacity of the free space 50 in the current writing destination block, i.e., the remaining amount of the current writing destination block. Then, the controller 10 determines whether or not the write data can be written to the current writing destination block, on the basis of the length DL of data to be written and the remaining amount of the writing destination block. In other words, the controller 10 determines whether or not the remaining amount of the current writing destination block is insufficient for new data to be written.

Step S22:

If the remaining amount of the current writing destination block is sufficient (i.e., Step S22; Yes), then the process terminates Step S20, and moves to Step S30. If the remaining amount of the current writing destination block is insufficient (i.e., Step S22; No), then the process proceeds to the next Step S23.

Step S23:

If the remaining amount of the current writing destination block is insufficient, then the writing destination block needs to be changed to a next block. Note that, however, the next block also needs to be included in the EEPROM alternative space 40. Thus, the controller 10 checks if the next block is included in the EEPROM alternative space 40 with reference to the alternative space information ALT. If the next block is not included in the EEPROM alternative space 40 (i.e., Step S23; No), then the controller 10 performs abnormal condition processing (example: stop, error output, and the like) (Step S25). If the next block is included in the EEPROM alternative space 40 (i.e., Step S23; Yes), then the process proceeds to the next Step S24.

Figure 10:
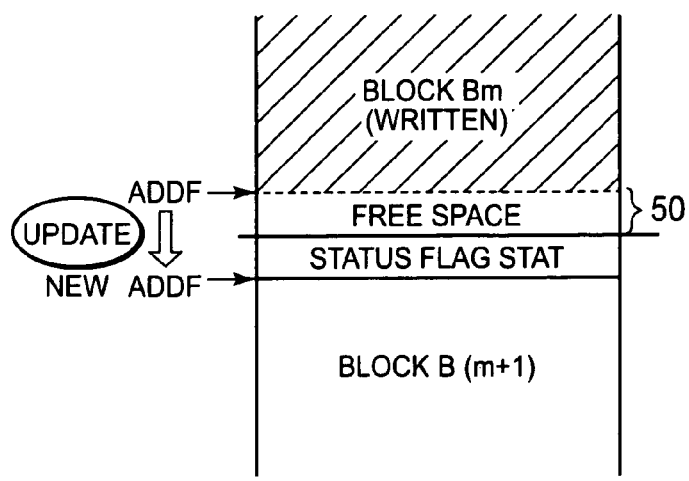
FIG. 10 is a schematic diagram for illustrating Step S20 of the data writing processing according to the first exemplary embodiment.

Step S24:

As shown in FIG. 10, the controller 10 moves the free space head address ADDF from the current writing destination block (example: Bm) to the next block (example: B(m+1)). Note that, however, the status flag STAT is stored in the head of the next block. Accordingly, while allowing for the size of the status flag STAT, the controller 10 updates the free space head address ADDF with an address following the status flag STAT of the next block. In other words, the controller 10 updates the free space head address ADDF with the head address of the free space 50 in the next block. The controller 10 reflects the update of the free space head address ADDF in the free space information DFS in the RAM 30. Thereafter, the process moves to Step S30.

4-2. Writing Processing (Step S30)

Figure 11:
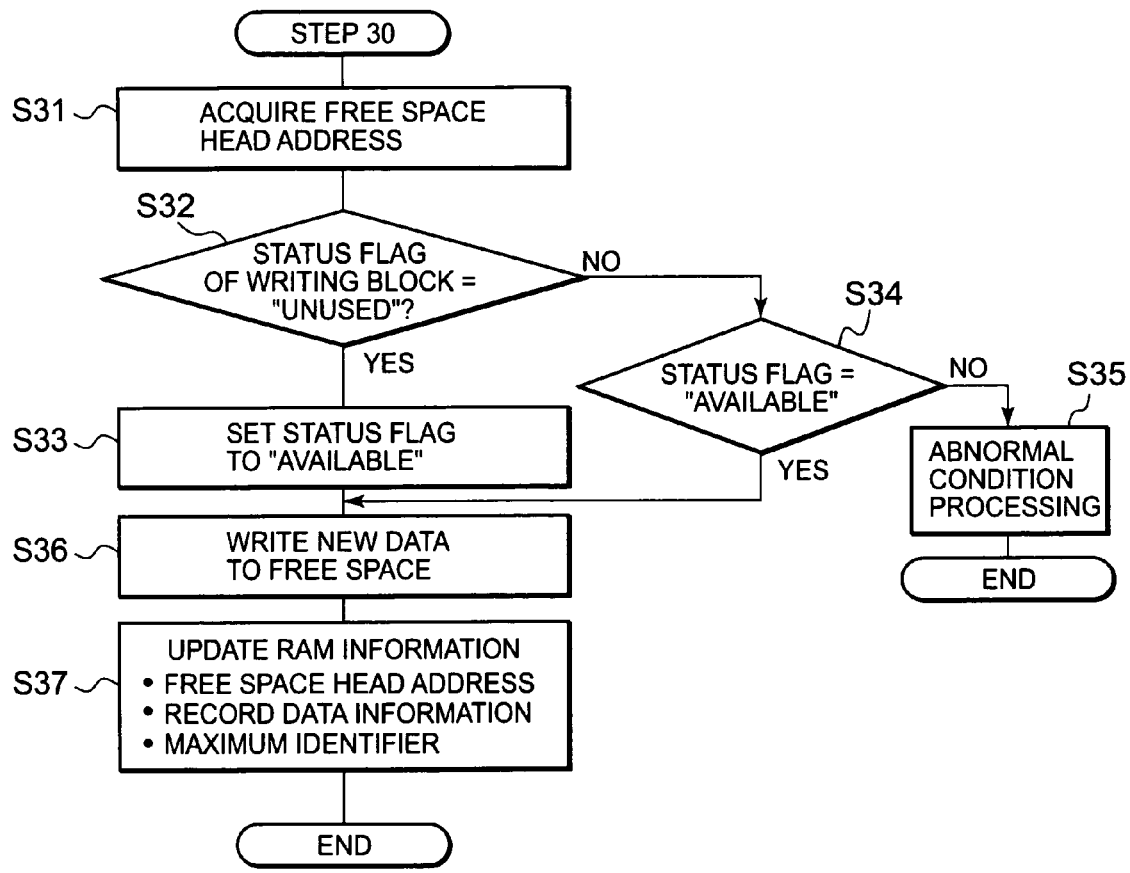
FIG. 11 is a flowchart showing Step S30 of the data writing processing according to the first exemplary embodiment.

FIG. 11 is a flowchart showing Step S30 according to the first exemplary embodiment.

Step S31:

The controller 10 acquires the free space head address ADDF with reference to the free space information DFS stored in the RAM 30. A writing destination block is a block where the head of the free space 50 indicated by the free space head address ADDF exists.

Step S32 to S35:

The controller 10 checks the status flag STAT of the writing destination block. If the status flag STAT indicates "unused" (i.e., Step S32; Yes), then the controller 10 sets the status flag STAT to "available" (Step S33). Thereafter, the process proceeds to Step S36. If the status flag STAT indicates "available" (i.e., Step S32; No, Step S34; Yes), then the process proceeds to Step S36. In other cases, the controller 10 performs abnormal condition processing (example: stop, error output, and the like) (Step S35).

Step S36:

The controller 10 writes new write data DAT (i.e., identifier ID, data main body, end flag FL) to the free space 50 of the writing destination block. More specifically, the controller 10 writes the new write data DAT to the head of the free space 50 indicated by the free space head address ADDF. In essence, the controller 10 sequentially adds the new write data DAT to the free space 50 without overwriting existing data with the new write data DAT. When data DAT with a certain identifier ID is written, existing data with the same identifier ID is not rewritten, and the data DAT thus written becomes the latest data with this identifier ID.

Figure 12:
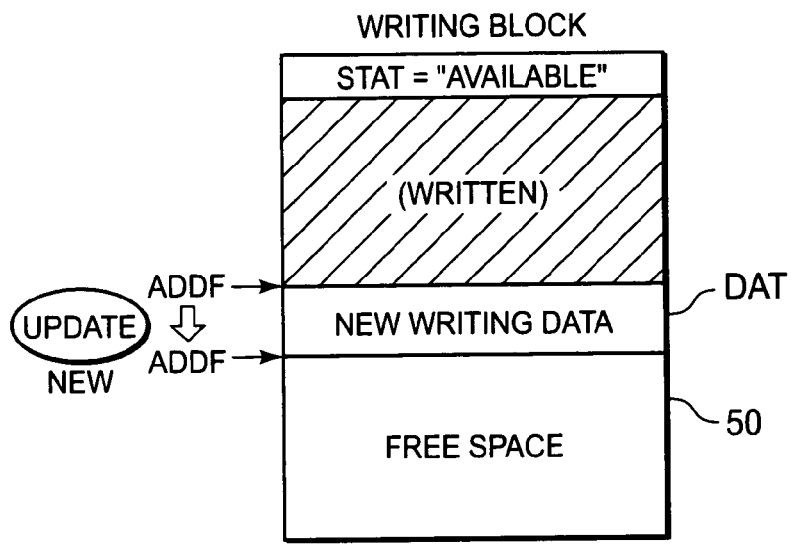
FIG. 12 is a schematic diagram for illustrating Step S30 of the data writing processing according to the first exemplary embodiment.

Step S37:

Subsequent to step S36, the controller 10 updates information stored in the RAM 30. Specifically, as shown in FIG. 12, the controller 10 updates the free space head address ADDF indicated by the free space information DFS, by shifting it by an amount of the write data DAT. The shift amount for this update of the free space head address ADDF can be calculated on the basis of the data length DL, the sizes of the identifier ID and the end flag FL, of the write data DAT.

Further, the controller 10 updates the record data information STR indicating the head address ADD and the data length DL of the latest data, on the basis of the writing destination (i.e., free space head address ADDF) and the data length DL of the write data DAT. What is updated here is the record data information STR on the identifier ID of the write data DAT. For example, when the data DAT1 with the identifier ID1 is newly written, the record data information STR-1 (i.e., head address ADD1, data length DL1) corresponding thereto is updated.

If the write data DAT is of a new type, then a new identifier ID is assigned thereto. For example, the assigned identifier ID is determined and managed by the user. The controller 10 creates new record data information STR corresponding to the new identifier ID, and stores it in the RAM 30. Further, if the new identifier ID is larger than the maximum identifier IDmax, then the controller 10 updates (overwrites) the maximum identifier IDmax indicated by the maximum identifier information NUM with the new identifier ID.

As described above, according to the first exemplary embodiment, it is possible to instantly access the head of the free space 50 by referring to the free space information DFS stored in the RAM 30. This enables fast writing of new write data DAT to the EEPROM alternative space 40. The skip processing as shown in FIG. 1 is not required for detecting the head of the free space 50. Even when many pieces of the data DAT have already been written in a block, it is possible to immediately access the free space head address ADDF by referring to the free space information DFS. In other words, access processing time in the EEPROM emulation is reduced. Further, variation in access processing time is eliminated since no skip processing is performed. This facilitates system design.

4-3. Copy Processing (Step S40)

If the writing destination block is changed to the next block in Step S20 described above, each of the latest data DAT with the respective identifier ID, which have been recorded in the original block, can be copied to a new block. Note that, the copy processing is an option, and does not necessarily have to be performed.

Figure 13:
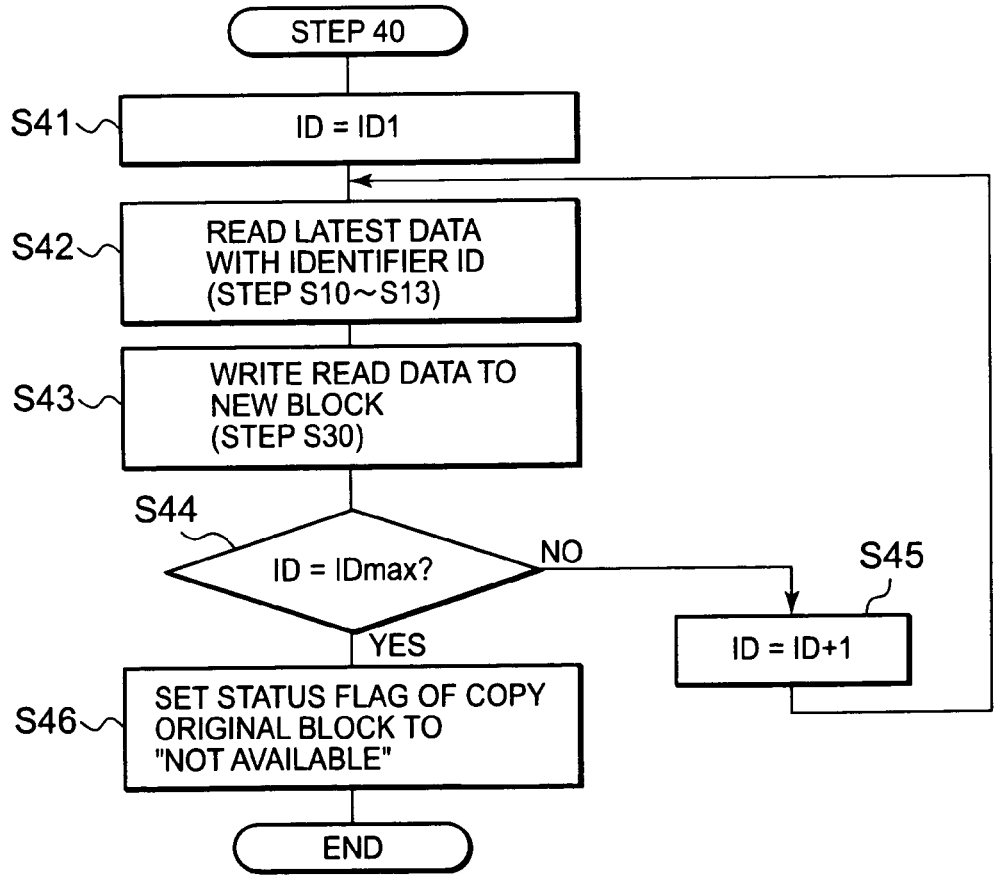
FIG. 13 is a flowchart showing Step S40 of the data writing processing according to the first exemplary embodiment.

FIG. 13 is a flowchart showing Step S40 according to the first exemplary embodiment. Firstly, the controller 10 sets an identifier ID used for loop processing to "ID1" (Step S41). Subsequently, the controller 10 reads the latest data DAT with the identifier ID thus set from the EEPROM alternative space 40 (Step S42). This reading processing is the same as that in Steps S10 to S13. Next, the controller 10 writes the latest data DAT thus read to a new block (Step S43). This writing processing is the same as that in Step S30.

Then, the controller 10 compares the current identifier ID with the maximum identifier IDmax indicated by the maximum identifier information NUM (Step S44). If the current identifier ID is smaller than the maximum identifier IDmax (i.e., Step S44; No), then the controller 10 increments the identifier ID by 1 (Step S45). Thereafter, Steps S42, S43 described above are performed again for a new identifier ID. If the current identifier ID is equal to the maximum identifier IDmax (i.e., Step S44; Yes), then it means that each of the latest data DAT with the identifier ID is copied to the new block. Lastly, the controller 10 changes the status flag STAT of the copy original block from "available" to "not available" (Step S46).

When such copy processing is performed, the maximum identifier information NUM is required; however, the number of available blocks in the EEPROM alternative space 40 is only 1. On the other hand, when the copy processing is not performed, the maximum identifier information NUM is not required; however, the number of available blocks continues increasing. Whether or not to perform the copy processing can be appropriately determined according to the user's demand.

5. Summary

According to the first exemplary embodiment, fast reading from, and fast writing to, the flash memory 20 can be achieved in the EEPROM emulation. In essence, access processing time in the EEPROM emulation is reduced as a whole. Recently, energy-saving products giving consideration to the environment have been demanded. To achieve the energy-saving products, it is necessary not only to reduce the power consumption during operation, but also to complete the processing in a short period of time so as to allow a quick shift to the standby mode having less power consumption. In other words, a faster data access is essential. In this regard also, the technique according to the first exemplary embodiment is useful.

Figure 14:
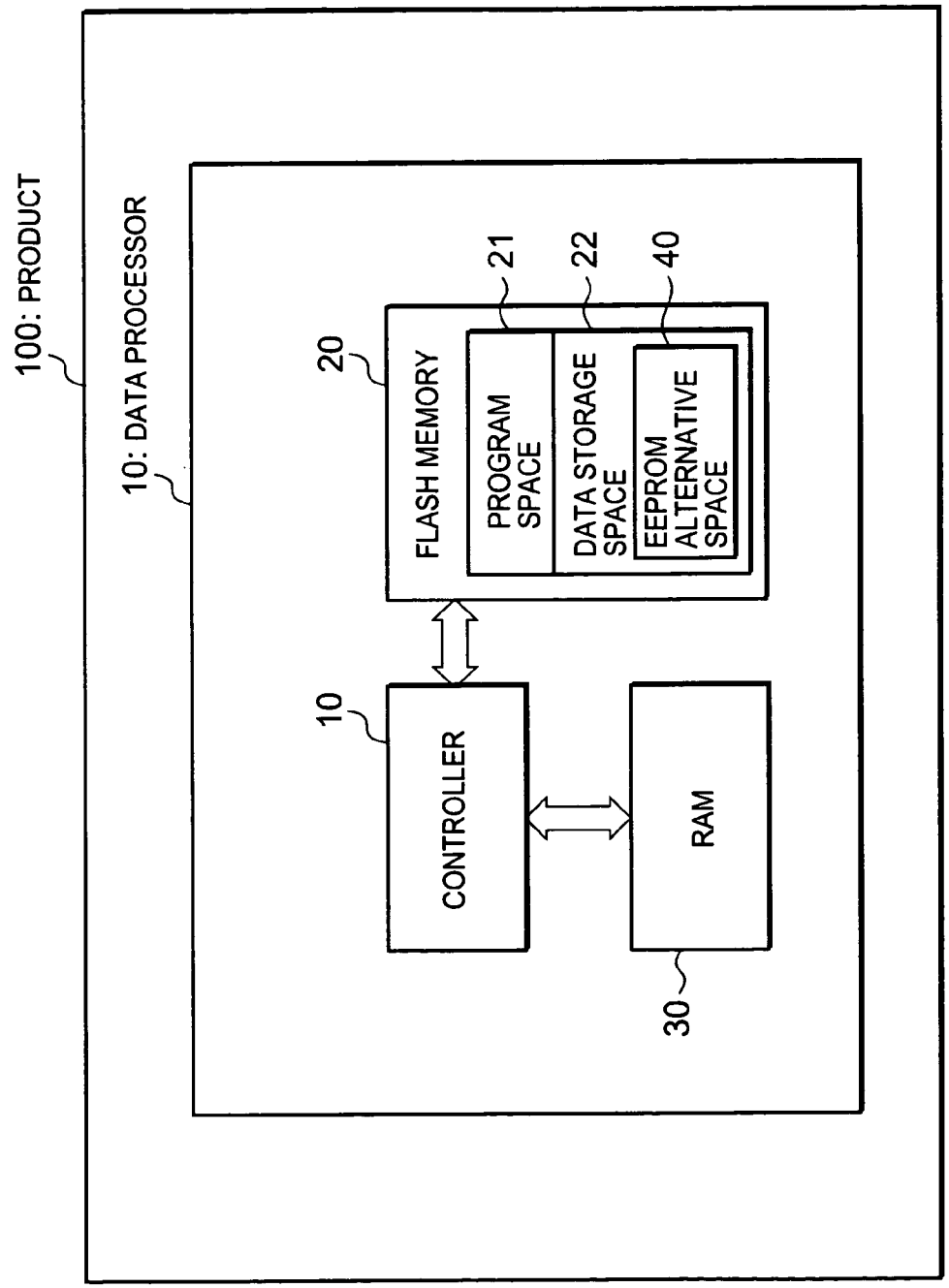
FIG. 14 is a block diagram showing an example of installing the data processor 1 in a product 100.

Furthermore, as shown in FIG. 14, the data processor may be installed in various products (e.g., a product 100 in FIG. 14), for example, home electric appliances, vehicles, etc. with great benefit.

Although the invention has been described above in connection with the exemplary embodiment thereof, it will be appreciated by those skilled in the art that this exemplary embodiment is provided solely for illustrating the invention, and should not be relied upon to construe the appended claims in a limiting sense.

Further, it is noted that, notwithstanding any claim amendments made hereafter, applicant's intent is to encompass equivalents all claim elements, even if amended later during prosecution.

What is claimed is:

1. A method of accessing a flash memory, comprising:
   reading latest data for each identifier from a flash memory, said reading comprising;
   creating a free space information indicating a free space head address based on an identified head of the free space,
   creating record data including a head address in the flash memory and a data length in response to each of the read latest data;
   storing the record data and the free space information into a random access memory (RAM), with respect to each of the identifier;
   acquiring an identifier of a reading target;
   reading the record data corresponding to the identifier of the reading target and the free space information from the RAM;
   reading data of the reading target from the flash memory based on the read record data; and
   writing new data to the head of the free space with reference to the read free space information without overwriting existing data when writing new data to the flash memory.

2. The method according to claim 1,
wherein the flash memory includes a plurality of blocks, and each block includes a status flag,
wherein the reading of the latest data comprises:
   searching the status flag from a last block toward a head block in the flash memory; and
   identifying a block including a status flag indicative that the latest data is included therein, as a last available block.

3. The method according to claim 2,
wherein data stored in the block of the flash memory includes the identifier, a data main body, and an end flag,
wherein the reading of the latest data further comprises:
   searching the end flag of the data from the end address of the last available block toward the head address thereof;
   identifying a space following the end flag firstly detected as a head of a free space; and
   storing the free space information into the RAM.

4. The method according to claim 2,
wherein data stored in the block of the flash memory includes the identifier and a data main body,
wherein the reading of the latest data further comprises:
   reading the data from an end address of the last available block toward a head address thereof; and
   identifying the read data as the latest data corresponding to a new identifier, when the data with a new identifier ID is read.

5. The method according to claim 1,
wherein the flash memory includes a plurality of blocks, and each block comprises a status flag,
wherein the reading data of the reading target comprises:
   confirming the status flag of a reading target block storing the reading data; and
   cancelling a reading operation to execute an abnormal condition processing, when the status flag indicative that the latest data is included therein is not confirmed.

6. The method according to claim 3, further comprising:
acquiring the free space information from the RAM.

7. The method according to claim 6,
wherein the writing comprises:
   confirming the status flag of a writing target block for writing the new data; and
   cancelling a writing operation to execute an abnormal condition processing, when the status flag indicative that the latest data is included therein is not confirmed.

8. The method according to claim 6, further comprising:
creating a new record data including a head address in the flash memory and a data length in response to the new data, when the record data corresponding to the identifier of the new data is not stored in the RAM; and
storing the new record data into the RAM, with respect to the identifier of the new data.

9. The method according to claim 6, further comprising:
creating an updating record data including a head address in the flash memory and a data length in response to the new data, when the record data corresponding to the identifier of the new data is stored in the RAM; and
updating the record data corresponding to the identifier of the new data in the RAM, with the updating record data.

10. The method according to claim 4, further comprising:
detecting a maximum identifier number of the identifier corresponding to the latest data; and
storing the detected maximum identifier number as a maximum identifier information into the RAM.

* * * * *